United States Patent

[11] 3,547,093

[72] Inventor Clarence A. Sherman
 Birmingham, Michigan
[21] Appl. No. 752,319
[22] Filed Aug. 13, 1968
[45] Patented Dec. 15, 1970
[73] Assignee Benton Corporation
 Troy, Michigan
 a corporation of Michigan

[54] INTAKE AIR PREHEATER VALVE ASSEMBLY
 9 Claims, 3 Drawing Figs.
[52] U.S. Cl. .................................................. 123/179;
 239/126, 127; 431/89
[51] Int. Cl. .............................................. F02n 17/04
[50] Field of Search ........................... 123/122(D)(G),
 179(H), 142.5; 431/89; 239/124, 126, 127

[56] References Cited
UNITED STATES PATENTS

| | | | |
|---|---|---|---|
| 2,614,888 | 10/1952 | Nichols | 239/126 |
| 2,993,487 | 7/1961 | Konrad et al. | 123/122(G) |
| 3,093,126 | 6/1963 | Baker | 123/142.5 |
| 3,258,054 | 6/1966 | Sherman | 431/89 |
| 3,353,520 | 11/1967 | Haag | 123/122(D) |
| 3,379,184 | 4/1968 | Wolf | 123/179(H) |

Primary Examiner—Allan D. Herrmann
Attorney—Barnard, McGlynn & Reising

ABSTRACT: An intake air preheater valve provided with a ball check valve assembly for allowing excess fuel from a nozzle for supplying fuel to an intake manifold to be returned to a sump except when a damaged line to the sump prevents that line from accommodating the full pressure of a backflow from an injection metering pump. The valve is used to direct fuel to an intake manifold of an internal combustion engine to preheat the intake air so that the engine can be started properly in cold climates.

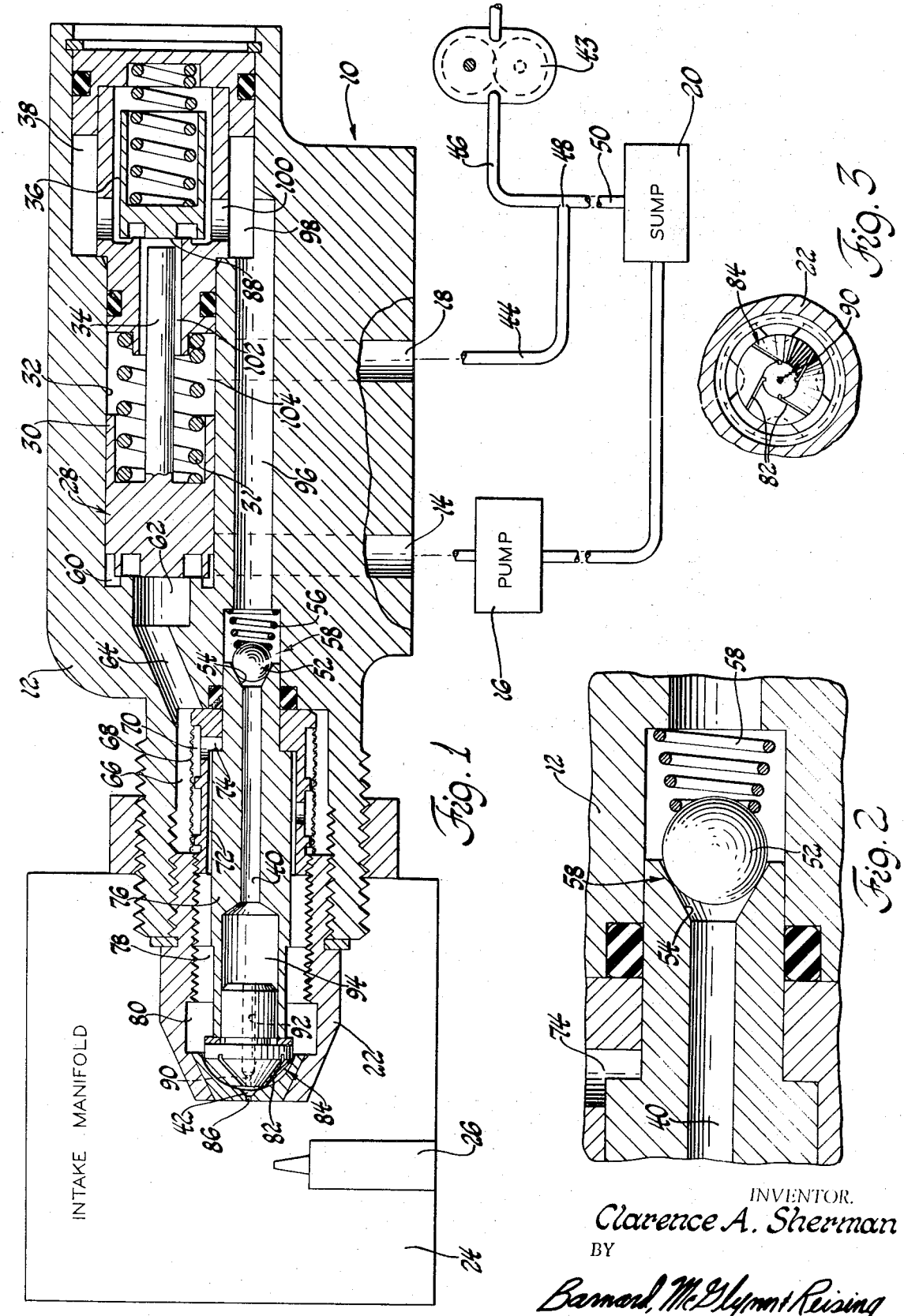

INTAKE AIR PREHEATER VALVE ASSEMBLY

The present invention relates to valve assemblies and more particularly to an improved intake air preheater valve for use with internal combustion engines, for example.

Diesel engines, as a rule, are very difficult to start in extremely cold climates because they depend upon the heat generated by compression to ignite the fuel and air charge in the cylinder. When the intake air is too cool, compression temperatures of such air is frequently insufficient for combustion. Therefore, it is desirable that the intake air be preheated before it is introduced into the cylinders by means of an intake air preheater so that the engine can be started in cold weather.

A system shown in the prior art for bringing about the preheating of the intake air is shown in U.S. Pat. No. 3,258,054, also assigned to the assignee of the present invention. Generally, such an engine preheater system includes a pump that draws fuel from a sump, on demand, and sprays a predetermined amount of this fuel into an intake manifold near an igniter where the fuel is burned thereby heating the air in the manifold. The igniter and nozzle are located within the intake manifold of the diesel engine. The nozzle used is generally of the type that utilizes only a portion of the fuel that is made available to the nozzle with the remainder of the fuel sent to the nozzle vented back through the valve assembly to the sump. Therefore, the line connecting the sump with the nozzle ordinarily is open if the engine intake air preheater system is a separate system from the normal fuel system of the engine.

However, in common practice, in view of the existence of a single source of fuel, the expedient of interconnecting the preheater fuel and normal engine fuel system to draw fuel from a single sump or fuel source for a diesel engine has been utilized. Therefore, an injection metering pump, which is the main source for pumping fuel directly into the cylinder of the diesel engine, draws fuel from the same sump that the engine preheater system draws fuel. At times, the injection metering pump creates a back pressure going toward the sump. The return line from the engine preheater pump and the injection metering pump becomes a common line near the sump or fuel supply, and ordinarily this line is sufficiently large to handle both the overflow or excess fuel from the nozzle as well as able to accommodate any backflow from the injection metering pump. However, it has been found in many installations, in the area where the return line is common, that is, near the sump, damage occurs because of rocks or debris from the terrain over which the vehicle travels which strike the line to partially block same. When this line becomes damaged, it is no longer capable of handling, under certain circumstances, all of the backflow from the injection metering pump as well as the excess fuel from the nozzle. Under these conditions, a pressure can be built up in the outlet from the valve assembly normally accommodating the excess fuel from the preheater nozzle. This causes fuel from the injection metering pump to go reversely into the nozzle causing an excess fuel condition therein.

When the aforementioned condition exists, and the engine preheater system is being utilized, for example, while the engine is being started, excess fuel can be introduced into the intake manifold and ignited therein, which, in addition to the fuel normally flowing from the nozzle because of the pressure of the preheater pump, can cause an explosion in the intake manifold which can seriously damage the engine. In addition, when the engine preheater system is not being utilized, that is, after the engine has been started in a cold climate, the backflow from the injection metering pump will introduce fuel into the nozzle in the intake manifold. This backflow condition through the nozzle will cause the fuel-air mixture going to the cylinders to be exceedingly rich. This occurs because the combination of excess fuel in the normally fuel-free intake air and the normal quantity of fuel from the injection pump is pumped into the cylinders causing an excess fuel condition in the cylinder. This causes an extremely uneconomical operating condition under the most favorable circumstances and, under the worst circumstances, can cause a greater explosion in the cylinder than the cylinder block can withstand and will, therefore, cause damage to the engine.

The only means shown in the prior art for correcting the aforementioned condition is to make the return line for the excess fuel from the preheater nozzle to the sump separate from the line going to the injection metering pump. This is a rather expensive alternative in that all of the units originally built and in the field have already been constructed with the common return line. In addition, this is a major modification to a vehicle and especially when the above-described system is installed on a vehicle in the field, the modification is impractical. Other than actually separating the described return lines to the sump, the prior art has not been responsive to the aforementioned problem.

The present invention contemplates the solution to the aforementioned problem by providing an improved intake air preheater valve assembly comprising a valve body having an inlet from a pressure source and an outlet to a sump, a nozzle carried by the valve body and extending into an intake manifold, an inlet valve selectively directing fuel to the nozzle, the nozzle having a passage for discharging excess fuel to the outlet, the outlet being in fluid communication with the injection metering pump, and means for preventing fluid from the injection metering pump from entering the nozzle through the passage. More specifically stated, a spring loaded ball check valve is provided between the main valve assembly and the nozzle to prevent backflow from the valve into the nozzle. In other words, in an improved intake air preheater valve assembly adapted to be connected to a nozzle for supplying fuel to an internal combustion engine, the nozzle being supplied more fuel than necessary for proper engine preheating with the excess fuel being directed back into the valve assembly, an improvement has been provided comprising means for directing excess fuel from the nozzle to a sump through the valve assembly under a first operating condition, the means operative to prevent excess fuel from going to the sump under a second operating condition. More specifically, a spring loaded ball check valve is provided which allows excess fuel from the nozzle to be directed to a sump under normal operating condition with the ball check valve seating to prevent excess fuel from going to the sump under operating conditions when a back pressure in the line from the nozzle to the sump is created by the injection metering pump. Therefore, the check valve is operative to prevent fluid communication from the injection metering pump through the outlet to the nozzle when the pressure on the check valve from the injection metering pump exceeds the pressure from the nozzle. The problem then is solved by merely changing a nozzle to incorporate the invention into an existing system. This is very expedient and economical.

Accordingly, it is an object of the present invention to provide an improved intake air preheater valve assembly adapted to be connected to a nozzle for supplying fuel to an internal combustion engine, the nozzle being supplied more fuel than necessary for proper engine preheating with the excess fuel being circulated back into the valve assembly, wherein the improvement comprises means for directing excess fuel from the nozzle to a sump through the valve assembly under a first operating condition, the means operative to prevent excess fuel from going to the sump under a second operating condition.

It is another object of the present invention to provide an improved intake air preheater valve assembly according to the previous object wherein the means recited therein is a spring loaded ball check valve.

It is a further object of the present invention to provide an improved intake air preheater valve assembly comprising a valve body having an outlet from a pressure source and an outlet to a sump, a nozzle carried by the valve body extending into an intake inlet valve selectively directing fuel to the nozzle, the nozzle having a passage for discharging fuel to the outlet which is in fluid communication with an injection metering pump, and means for preventing fluid from the injection metering pump from entering the nozzle through the passage.

Other objects and attendant advantages of the present invention will be readily appreciated as the same becomes better understood by reference to the following detailed description when considered in connection with the accompanying drawings wherein:

FIG. 1 is a sectional view of the improved intake air preheater valve assembly of the subject invention with associated portions of the system being diagrammatically shown.

FIG. 2 is an enlarged sectional view of the ball check valve assembly of the subject invention.

FIG. 3 is a view in elevation of the fuel directing means of the nozzle assembly.

Referring to FIG. 1, an intake air preheater valve assembly is shown and is generally designated by the numeral 10. The valve assembly comprises valve body 12 having an inlet 14 from a pressure source 16 and an outlet 18 to a sump 20. Nozzle 22, carried by valve body 12, extends into an intake manifold 24 of an internal combustion engine, not shown. Igniter 26 is in intake manifold 24 and functions to ignite fuel therein to heat air in a manner to be hereinafter described. An inlet valve generally designated by numeral 28 includes a slidable member 30 movable in bore 32 against spring 31 and includes an exhaust valve actuator 34. Exhaust valve 36 is movable in chamber 38 but also slides and is piloted in bore 32.

Nozzle 22 includes a passage 40 for discharging excess fuel from fuel metering chamber 42 to outlet 18 in a manner to be hereinafter described. Outlet 18 is in fluid communication with injection metering pump 43 by way of line 44 and line 46. Line 44 and line 46 merge into a "T" at point 48 which results in line 50 being a common return line for injection metering pump 42 and outlet 18 to sump 20.

Ball 52 seats against chamfered surface 54, which is an extension of nozzle 22, and is held in position by spring 56. Spring 56 and ball 52 form a ball check valve and collectively form means 58 for directing excess fuel from nozzle 22 to sump 20 through valve body 12 under normal operating conditions, means 58 being operative to prevent excess fuel from going to sump 20 from nozzle 22 under a second operating condition. The second operating condition being a condition when the injection metering pump 43 creates a back pressure in lines 46 and 44 into outlet 18 in a manner to be hereinafter described creating the problem solved by the present invention. In short, means 58 prevents fuel from injection metering pump 42 from entering nozzle 22 through passage 40, both under conditions when the present system is in operation, and when the preheat system is not in operation.

In operation and referring to FIG. 1, it will be assumed that the system of which the invention forms a part is disposed in the environment of an internal combustion engine that is about to be started in cold climate. As previously stated, this requires that the air of the intake manifold be heated due to the fact that a typical diesel engine maintains combustion by compressing fuel air mixture in a cylinder, and in cold climates this compression is insufficient to ignite the fuel due to the cold air mixed with the fuel in the cylinder. Consequently, preheater pump or pressure source 16 is turned on in any well-known fashion and communicates fuel under pressure to inlet 14. Inlet 14 extends through valve body 12 and terminates in valve chamber 60. Due to a differential in areas in chamber 60, a buildup of pressure therein eventually moves inlet valve 28 to the right as viewed in FIG. 1. This allows fuel to pass into chamber 62 through passage 64 into chamber 66. Fuel entering chamber 66 must pass through filter screen 68 into chamber 70 and eventually into chamber 72 by way of passage 74. Chamber 72 is formed on the periphery of nozzle body 76, and therefore a path for fluid communication is established through chamber 72 to chamber 78 and to collector chamber 80. Pressure then builds up in chamber 80 due to restrictive passages 82 formed on the face of fuel directing means 84 which is best seen in FIG. 3. The fuel, after passing through passages 82, fills fuel metering chamber 42 with a certain amount going to outlet 86. Outlet 86 is disposed in the intake manifold and presents a spray of fuel near igniter 26 to bring about a firing of the fuel and the consequent heating of the air in the intake manifold.

It should be noted that as inlet valve 28 moves to the right as seen in FIG. 1, exhaust valve actuator 34 engages exhaust valve 36, likewise moving it to the right from its seat at 88. Also, it should be noted, as previously stated, pressure source 16 provides more fuel flow than is necessary for proper operation of the air preheater, and the excess fuel is then vented through passage 90 in fuel directing means 84 through passage 92 to chamber 94 into passage 40. Spring 56 is a relatively low rate spring, and the pressure in passage 40 unseats ball 52 and communicates the fluid thereby into passage 96. Passage 96 terminates in chamber 98 which is in fluid communication with passage 100. With exhaust valve 36 off seat 88, the fluid in passage 100 is freely communicated past seat 88 through passage 102 to chamber 104 which is in free fluid communication with outlet 18. Therefore, the excess fuel from nozzle 22 normally eventually passes from outlet 18 through line 44 into line 50 at point 48 into sump 20. This is a normal operating condition.

One abnormal operating condition is set up when injection metering pump 43, which is operating at the same time as the air preheater system, creates a back pressure in line 46 that is normally accommodated by line 50 dumping the excess fuel to sump 20. However, as previously stated, in common installations line 50 is situated in such a position on a vehicle that line 50 can become restricted due to deflected rocks and logs causing wider carriage damage. Therefore, line 50 can be restricted accidentally. Line 50 then is no longer able to accommodate the flow from line 46 so the excess flow is taken up by line 44. This directs fuel from the injection metering pump through outlet 18 into chamber 104 which causes a backflow through the valve assembly, it being understood that valve 36 is off its seat when the preheater assembly is functioning properly. When this occurs, exhaust valve 36 will be off its seat at 88, and a path of fluid communication is set up in through passage 102, chamber 100, chamber 98, into passage 96. Therefore, the pressure acts upon ball 52 which drives ball 52 against surface 54 sealing off passage 40 from passage 96. Under these operating conditions, the adversely high pressure from the injection metering pump 43 cannot be communicated through passage 40, chamber 94, passage 92 and passage 90 into fuel metering chamber 42. Excessive pressure from injection metering pump 43, if communicated to outlet 86, would result in an extremely high amount of fuel being pumped into intake mainfold 24 and would result in rather poor fuel economy under the best conceivable condition, but more than likely would result in an explosion within the engine cylinder or the intake manifold due to hot valves. This destructive consequence is thereby prevented by the present invention.

Under another operating condition, a similar situation arises when line 50 is restricted and the air preheater valve assembly system associated therewith is not in operation, that is, when the engine is operating under combustion completely sustained by compression of the fuel by the cylinder in the normal way of diesel operation, for example. Under this condition, the exhaust valve 36 is seated as shown in FIG. 1, but the pressure from the injection metering pump 43 acting in chamber 104 drives exhaust valve 36 off its seat and presents the same fuel pressure in passage 96 as previously described. But for ball 52 functioning as a portion of means 58, the high pressure from the injection metering pump 43 would be able to inject fuel through outlet 86 into the intake manifold 24. Again, the fuel-air ratio to the diesel engine cylinder, for example, would be disturbed at the very least and possibly an explosion would occur either in the intake manifold or in the cylinder itself of such a type as to be destructive to the engine. The present invention also precludes engine damage under this operating condition by preventing backflow past means 58.

The invention has been described in an illustrative manner, and it is to be understood that the terminology which has been used is intended to be in the nature of words of description rather than of limitation.

Obviously, many modifications and variations of the present invention are possible in light of the above teachings. For example, the description herein relates to the use of this invention as an aid to cold starting of internal combustion engines However, this same invention is suitable for providing fumigation with controlled amounts of fuel of the intake manifolds of internal combustion engines as an aid to combustion under running operating conditions.

I claim:

1. An improved intake air preheater valve assembly adapted to be connected to a nozzle for supplying fuel to an internal combustion engine, the valve assembly having an outlet communicating with a sump and with an injection metering pump for the engine, the nozzle being supplied more fuel than necessary for proper engine preheating with the excess fuel being directed back into the valve assembly, the improvement comprising:

means for directing excess fuel from the nozzle to the sump through said valve assembly under a first operating condition; and said means being operative under a second operating condition to prevent fluid communication from the injection metering pump through said outlet to the nozzle when the pressure on said means from the injection metering pump exceeds the pressure from the nozzle.

2. The improvement according to claim 1 wherein said means is a valve.

3. The improvement according to claim 1 wherein said means is a ball check valve.

4. The improvement according to claim 3 wherein said ball check valve is spring loaded against the pressure of excess fuel from the nozzle.

5. An improved intake air preheater valve assembly comprising: a valve body having an inlet from a pressure source and an outlet to a sump; a nozzle carried by said valve body and extending into an intake manifold; and inlet valve selectively directing fuel to said nozzle; said nozzle having a passage for discharging excess fuel to said outlet, said outlet being in fluid communication with an injection metering pump; and means for preventing fluid from the injection metering pump from entering said nozzle through said passage.

6. An improved intake air preheater valve assembly according to claim 5 wherein said nozzle receives more fuel from the pressure source than is required for operation thereof and said means ordinarily passes the excess fuel to said outlet, said means being operative to prevent excess fuel from being passed when the injection metering pump causes a backflow of fuel through said outlet to said means, said means also preventing fuel from the injection metering pump from reaching said nozzle.

7. An improved intake air preheater valve assembly according to claim 5 wherein said means is a valve.

8. An improved intake air preheater valve assembly according to claim 7 wherein said means is a ball check valve.

9. An improved intake air preheater valve assembly according to claim 8 wherein said ball check valve is disposed in said valve body in a path for fluid communication between said nozzle and said outlet to a sump.